(12) United States Patent
Wols et al.

(10) Patent No.: US 9,240,096 B2
(45) Date of Patent: Jan. 19, 2016

(54) ELECTRONIC GAMING DEVICE WITH A LIGHT-EFFECT ARRANGEMENT

(71) Applicant: NOVOMATIC AG, Gumpoldskirchen (AT)

(72) Inventors: Martin Wols, Vienna (AT); Heinz Fridrich, Loebersdorf (AT)

(73) Assignee: Novomatic AG, Gumpoldskirchen (AT)

( * ) Notice: Subject to any disclaimer, the term of this patent is extended or adjusted under 35 U.S.C. 154(b) by 283 days.

(21) Appl. No.: 13/854,385

(22) Filed: Apr. 1, 2013

(65) Prior Publication Data
US 2013/0217494 A1    Aug. 22, 2013

Related U.S. Application Data

(63) Continuation of application No. 12/944,046, filed on Nov. 11, 2010, now abandoned.

(30) Foreign Application Priority Data

Nov. 13, 2009 (AT) ............................... A 1801/2009

(51) Int. Cl.
*G07F 17/32* (2006.01)

(52) U.S. Cl.
CPC ............ *G07F 17/3211* (2013.01); *G07F 17/32* (2013.01); *G07F 17/3216* (2013.01)

(58) Field of Classification Search
None
See application file for complete search history.

(56) References Cited

U.S. PATENT DOCUMENTS

| | | | | |
|---|---|---|---|---|
| 2007/0284814 | A1* | 12/2007 | Hirato et al. | 273/143 R |
| 2007/0287527 | A1* | 12/2007 | Tanabe et al. | 463/20 |
| 2011/0118034 | A1* | 5/2011 | Jaffe et al. | 463/42 |
| 2013/0217494 | A1* | 8/2013 | Wols et al. | 463/31 |

* cited by examiner

*Primary Examiner* — Seng H Lim
(74) *Attorney, Agent, or Firm* — Kevin H. Fortin

(57) ABSTRACT

The present invention is a gaming machine such as a slot machine having a housing with a light-effect arrangement for creation of light effects. The gaming machine has at least one reflector arranged on the housing such that the reflector is positioned with respect to a remote light source to reflect a light beam from the remote light source at least partly towards the front of the housing. The housing may include a light source, which may be a strip of LED lights that emits a light beam. This arrangement is particularly beneficial in modern gaming devices. A higher degree of design freedom relative to light source arrangement is achieved through the use of reflectors and the light source.

17 Claims, 4 Drawing Sheets

ELECTRONIC GAMING DEVICE WITH A LIGHT-EFFECT ARRANGEMENT

RELATED APPLICATION

This patent application is a continuation of co-pending U.S. patent application Ser. No. 12/944,046, filed 11 Nov. 2010, the disclosure of which is incorporated herein by reference.

FIELD OF THE INVENTION

The present invention relates to gaming machines, particular to slot-machines and other entertainment devices.

BACKGROUND OF THE INVENTION

Gaming machines are found in casinos and amusement arcades and offer entertainment and gaming pleasure to many people. Various gaming machines are popular with the gaming public. Reel slot machines have several rotating reels with various play icons arranged in the display panel's viewing windows or electronically on display screens. In some reel slot machines other display media can be represented as rotating to output a game win when the reels remain standing with identical play icons along a pay line. Poker slot machines enable virtual poker play. Betting slot machines enable bets to be placed on events, for example, sporting performances.

Gaming machines are typically constructed as floor-mounted appliances, being stationary units and having a front side of which an interface is provided. In some cases, there is more than one interface in the upper section of the housing so that they can be observed or tracked from an operator's station in front of the housing.

An operator's panel included in the interface typically includes several control buttons are provided below at least one display. The operator's panel may be a touch screen, or other interface element, at about the ventral height of a player standing in front of the device. Control buttons may be manually operated and may serve, among other things, to set reels of a reel slot machine in motion, or to stop them. The device's various functional building blocks, like the game controller, a currency authentication device, and/or a currency collection apparatus, can be accommodated within the housing's interior.

These kinds of gaming and entertainment devices are routinely set up in large groups in a casino or in an amusement arcade. In this context, the devices can be arranged in a row next to one another or arranged radially, in a star-shaped manner, around a column. To make a particular gaming device successful in the sense that it is selected by many players for playing, it is routinely attempted to distinguish the gaming device from the mass of neighbouring gaming devices via light effects and the like, to direct the attention of as many players as possible on itself.

It is known to create light effects in different ways in this context. For instance, multicoloured light sources, like LEDs, are routinely placed on the front side of the housing to emit multicoloured light beams into the space in front of the gaming device in which the operator is standing respectively a potential operator runs by. On the other hand, lights blinking in the fashion of lighthouse lights are also known to be positioned on the upper side of the devices. These shine a periodically rotating light beam into the room area.

A gaming device of the kind named at the beginning is shown in U.S. Pat. No. 7,048,631 B2. A light display is provided on the device's front side to display game information. The light display employs a refractive, transparent plate into which light of various colours can be fed from various directions. The light then passes through the transparent plate and emerges refracted at a predetermined emersion point. The intent is to create many kinds of gaming information in the form of light signals via light refraction. However, the increase achieved in the gaming device's attractiveness is limited because the light signals or light effects are only really visible when the player is already standing at the gaming device and using it. Moreover, the light signals are of rather low range and limited luminosity. This renders them perceptible in only a limited way to passing players.

WO 2007/032784 describes a gaming device with a backlit display, the brightness of which is variably controlled. In this context, ambient light is measured using light sensors to set the backlit display brighter or darker as a function of the ambient light.

Still there is a need for an improved gaming machine which enhances the prior art in an advantageous way.

SUMMARY OF THE INVENTION

The invention is a gaming machine having housing. The housing includes a light source and at least one reflector on the outside of the device's housing. The reflector reflects light impinging from the gaming device's environment, and reflects that light into the space that can be considered the gaming device's zone of attraction.

Many kinds of light effects may be created by redirecting from light sources. However, because the front of the housing has limited space readily visible to an operator, light sources would optimally be placed in areas other than the front of the machine.

Through the use of reflectors, a higher degree of freedom relative to light-source arrangement can be achieved, particularly on machines where the gaming interface occupies a large portion of the housing. Advantageously, the light sources no longer need to be placed on the front side of the housing, but can be displaced into areas around the gaming device not within the field of view itself because the reflectors can provide an appearance of more light intensity.

In accordance with one aspect of the invention, at least one reflector on the outside of the housing is illuminated by a remote light source, positioned remotely from the gaming machine. Various support surfaces located in the device's vicinity, like room walls or pieces of furniture can be used to position the light source.

A neighbouring gaming device, in accordance with the invention, can illuminate or irradiate at least one reflector on the housing's exterior when the light source is arranged on an adjacent gaming machine. The reflector is turned with its open capture cross section towards a device location set up laterally next to the gaming or entertainment device's housing to receive light from an adjacent gaming machine.

For example, the reflector captures light from one of the light sources arranged on adjacent, or neighbouring, devices. The reflector reflects the light into the field of view of a player standing in front of, or walking past the gaming machine.

The light source, in one embodiment of the invention, may both irradiate a reflector mounted on the same gaming machine as well as to irradiate a reflector provided on a neighbouring gaming or entertainment device. The intent is to create a corresponding light effect on the neighbouring gaming or entertainment device. Advantageously, devices arranged next to one another irradiate one another reciprocally. This means that the light source on one device irradiates the respective reflector on the other device. It is not hereby necessary to position a particular light source in the reflector's centre. The reflector's surface can be constructed free of light sources.

According to an alternate embodiment of the invention, the light source, which is intended to irradiate a neighbouring device and the reflector provided thereon, can be positioned in the immediate vicinity of the reflector on the same housing. The reflector lying next to the light source may be shielded from the light source. Thus, light from the light source situated in the immediate vicinity does not fall on its own device's reflector. Appropriate means of shielding can be shading due to the configuration of the housing or from a housing edge for instance, or via a separately placed shading element.

Alternatively, or in addition to, irradiating the reflector from a neighbouring gaming device, a light source that irradiates the light-effect arrangement's reflector can also be mounted on the respective gaming device itself. Self-sufficient light-effect creation is hereby provided that is not dependent on setting up additional gaming or entertainment devices and their exact orientation to one another.

By redirecting light emitted from the light source via the said reflector, the light source can be advantageously situated in a "hidden" section of the space, meaning especially on a side of the housing not within the field of view of a player standing in front of the device. On the one hand, best possible use can hereby be made of the construction space available. On the other hand, such an arrangement can reduce the light source's blinding effect, since a player is no longer looking directly into the light source, but can nevertheless perceive the redirected secondary light as a light effect.

The light-effect arrangement's one or more reflectors can basically be variously constructed and possess various forms. To achieve a bright and targeted focusing of the emitted light signal within the desired section of space, the reflector is given concave form in a favourable embodiment of the invention. A cup-shaped, rotationally symmetrical form, for instance, with a parabolic cross section is possible for the reflector's surface in this connection. To achieve a broader, more linear light beam emission that illuminates a larger area, a favourable implementation of the invention provides for a reflector surface in the form of a longitudinally concave reflector channel, which can form a groove.

In this context, the reflector can in principle form an independent part separate from the housing, which is attached to the housing. However, to retain the gaming device's smooth outer contour, preferred embodiment of the invention provides for the reflector to be integrated into one of the housing's wall sections or that one of the housing's wall sections include an integrated reflector surface.

One or more reflectors can be formed from one of the grooves integrated into the housing's surface. The groove's surface is constructed to be reflective, in particular, metallic. The reflective surface construction can be achieved in various ways depending upon the texture of the housing wall. For instance, if the corresponding section of the housing wall is made of metal, the reflector can be formed from a metal surface polished sufficiently smooth. If a wooden or plastic housing is provided, a reflective surface coating can be applied to the section of the housing wall in question. This may occur in the form of a reflective or reflecting foil or of a sprayed on, spray deposited, or sputtering deposited surface layer.

In this connection, the reflector's surface can in principle be variously contoured or shaped depending upon the light effect desired. In an advantageous embodiment of the invention, the reflector's surface can form a continual, constantly curved, smooth concave surface. Alternatively, the reflector's surface can feature an upper surface structure with transition areas between various sections, where, for instance, a scale structure can be integrated into the reflector's surface.

The reflector can basically be situated on various sections of the housing. To consume little front-side surface and—when the width of the display and control apparatuses are given—to be able to construct a narrow housing, but also to retain a high degree of freedom regarding arrangement of the light source, an advantageous embodiment of the invention provides that one or more reflectors are provided on one edge of the housing between two housing panels or housing sections.

In particular, at least one reflector can be situated on a lateral edge section of the housing and possess an angular orientation such that it captures light coming from the side of the housing and emits towards the device's front side in a direction in front of the device and/or over the device.

According to an advantageous embodiment of the invention in this context, one or more reflectors can be arranged going into the depth or extend with its longitudinal axis at an acute angle to the housing depth, preferably ascending somewhat parallel to a vertical longitudinal plane of the gaming or entertainment device diagonally from the front side of one device backwards to the back side of a device. Such a ramp-like tending orientation of the reflector going into the depth on the one hand enables the reflector to shine diagonally from the right and/or left side of the device, but, at the same time, emitting the light beams producing the light effect into the device's zone of attraction. This means illuminating the field of view of a player standing in front of the device or walking past, and in doing so creating an ever-perceptible, ascending light column to a player standing in front of the device.

In particular, the reflector can be provided on the lateral housing edge, which supports or encloses a gaming device control panel or a display apparatus situated above the control panel, at which the said housing section (or those of these enclosed lateral housing edges) descends tending to the horizontal at an acute angle to the device's front side (or to one of the players standing in front of it).

Alternately, or in addition, a reflector can also be provided on a lateral housing edge of an upper housing section, which encloses or supports a display apparatus, preferably at about head height, and extends in an upright, in particular a vertical, orientation.

Alternatively, or in addition, at least one reflector can also be provided on one of the housing's horizontal edge sections, advantageously on one of the housing's bent or curved transition sections between a lower and an upper display apparatus. Alternatively, or in addition, an appropriate reflector can also be provided on a horizontal edge section or on top of the housing, which can be illuminated from a light source above the said edge section. This can be done, for instance, by a light source arranged on a attachment attachable to the top. Alternatively, or in addition, a reflector can also be arranged on the said attachment on a lower edge section hereof, which is irradiated by a light source on the top of the device's housing.

At least one reflector is provided on the outside of the housing in an advantageous way to achieve the greatest possible reflector surface, which reflector surface possesses a length corresponding to at least three times, preferably at least five times, and if necessary to more than ten times the width of the reflector's surface. An elongated, narrow reflector surface is thus advantageously provided.

The degree of the reflector surface's concavity can be basically variously designed and adapted to the spacing of the intended installation conditions for the device. In an advantageous embodiment of the invention, when the reflector's surface is constructed in the form of a groove, the concavity's depth can amount to less than one quarter of the groove's width. Uniform curvature, meaning circular-arc-form cross section, of the reflector's surface is advantageous. To achieve a light beam defined on the boundaries and specifically perceptible, the reflector's surface is linear on the edge, preferably bounded by an angled edge forming the transition from the groove integrated into the housing's wall to the adjacent wall sections.

DETAILED DESCRIPTION

Figure 1:
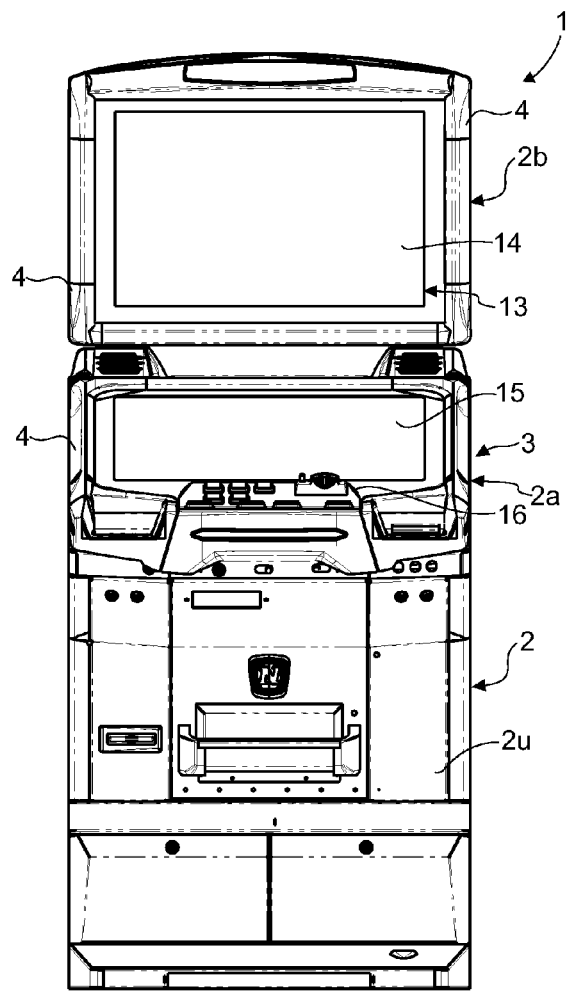
FIG. 1 shows a front view of a gaming device according to the invention.
Figure 3:
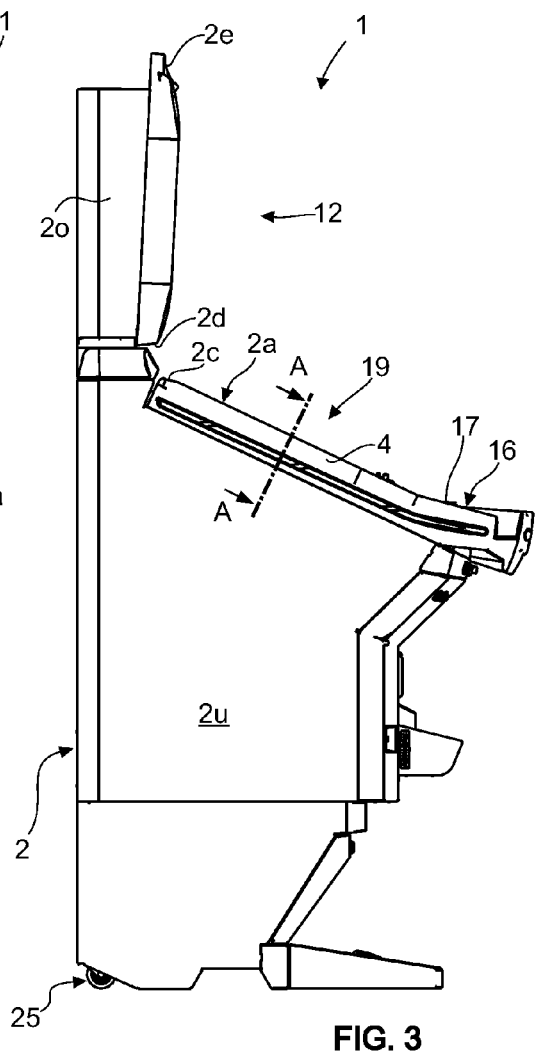
FIG. 3 shows a side view of the gaming device of FIG. 1.
Figure 2:
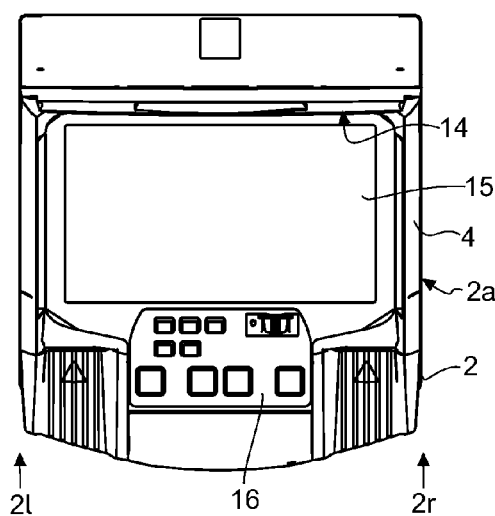
FIG. 2 shows a plan view of the gaming device of FIG. 1.

FIGS. 1-3 show the gaming device 1 in accordance with the present invention. The device 1 is a floor-mounted appliance in the form of a stand-alone device. Roughly speaking, it comprises a box-shaped housing, 2, about the height of a man, the upper half of which incorporates a display apparatus, 13, consisting of two large area screens, 14 and 15, arranged one above the other in the embodiment shown. As FIG. 1 shows, both screens, 14 and 15, are arranged obtusely inclined towards one another, where the upper screen, 14, extends substantially vertically, while the lower screen, 15, is arranged with descending inclination to the player. In this context, the housing, 2, can be subdivided into several modules so that, for instance, an upper housing module, 2o, on which the upper screen, 14, is arranged, can be taken off of, or place onto, the lower housing module, 2u, on which the said lower screen 15 is arranged, as a comparison of FIGS. 1-3 on the one hand, and FIG. 7 on the other shows.

The housing 2 of the gaming device 1 possesses a panel section beneath the screens, 14 and 15, projecting towards the player, which extends over the entire breadth of the device's housing 1 and is essentially box-shaped. In the embodiment shown, the said panel section 16 connects continuously to the housing section, which accommodates the lower screen 15 tending in about the same direction.

The top side of the panel section 16 houses a control panel 17 that included several manually activated control keys, in the form of push-button switches for instance. In this connection, mechanical switches, a touch screen's control panels, or other controls can be provided.

Furthermore, the housing 2 features rollers 25 arranged on a rear lower longitudinal edge with the help of which the gaming device can be easily rolled, transferred, or moved. In the process, the special projection and position of the control panel 17 in relation to the rollers 25 is particularly helpful for being able to easily grip and lift the gaming device on the front side and so being able to move it in wheelbarrow fashion.

The games displayable on the screens, 14 and 15, are controlled by an electronic controller (situated in the housing's interior), preferably in the form of a processor, which is accommodated in the lower section of the interior of the housing 2. On the one hand, the said controller controls the display apparatus 13 in this context and, on the other, communicates with the control panel's 17 control keys. In doing so, other functional components like a winning output device, a currency input, and an authentication device can be controlled from the controller.

In addition to the said display apparatus 13 the gaming device 1 includes a light-effect device 3 with the help of which its light beams can be shone into the space in front of and/or above the front side 19 of the housing 2. In the embodiment shown, the said light-effect device 3 includes several reflectors 4 which are each arranged on the outside of the housing 2.

FIG. 1 shows, reflectors 4 provided in the embodiment form shown here on the lower housing section, 2u, in the area of the screen 15 and/or of the control panel 17. In doing so, the reflectors 4 extend advantageously to the lateral edges of the housing 2 which flanks the said screen 15 and/or the control panel 17 and form the transition region between the side walls of the housing 2 and the top of the lower housing section, 2u, sloping towards the player. In the embodiment shown, additional reflectors 4 are furthermore attached to the lateral edges of the upper housing section 20. These flank the upper screen 14 right and left and are located in the transition region between the side flanks and the front side of the upper housing section, 2o. Additional reflectors 4 can be provided, without this being specifically drawn, which are advantageously oriented horizontally and/or can extend diagonally across a housing section arranged on the front side. In particular, an appropriate reflector 4 can be located on the upper edge section, 2c, of the lower housing part, 2u, which is provided between the two screens, 14 and 15. Alternatively, or in addition, such a horizontally oriented reflector 4 can also be provided on the lower edge or on the lower edge section 2d of the upper housing part 20 which encloses the upper screen, 14. Alternatively or in addition, a reflector 4 can in turn also be provided on an upper edge section, 2e, of the upper housing part, 2o, which encloses the said upper screen 14. Alternatively, or in addition, the gaming device cannot possess an attachment not specifically shown in FIG. 1, which attachment is attachable on the top of said housing part, 2o, where such an attachment can include, for instance, a loudspeaker unit, a blinking light unit, or the like. If such an attachment is provided, it can include a reflector 4, which extends to a lower edge or to a lower edge section of the attachment, which is turned facing the said upper edge section, 2e, of the upper housing part, 2o.

The reflectors 4 thus extend advantageously in the region of an edge, bounded by a housing section, between two mutually angled housing panels or sections so that the reflector 4 faces towards different sides of the housing, so that the respective reflector 4 can on the one hand capture light coming from one side and on the other emit it to a different side in the form of a beam.

Figure 5:
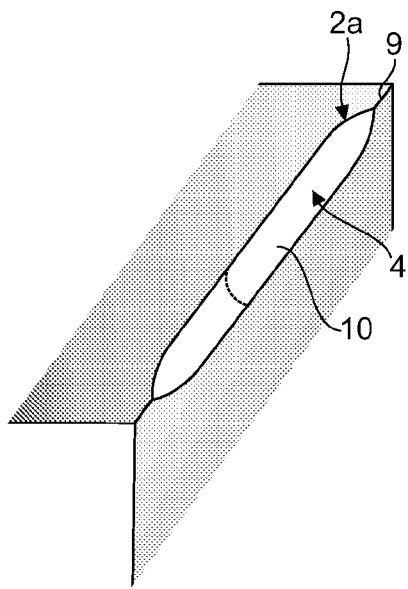
FIG. 5 shows a perspective view of the reflector in a grooved edge of the lateral housing edge of the gaming device from FIG. 3.
Figure 6:
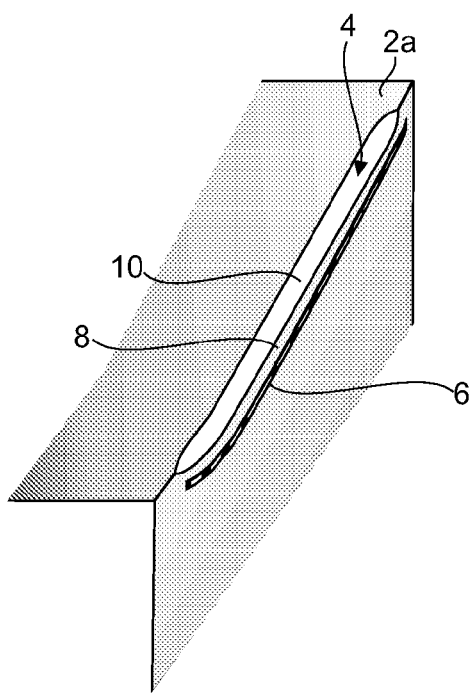
FIG. 6 shows a schematic, perspective view of the groove-shaped reflector surface with the rod-like light source arranged next to the groove, to illuminate one of the reflectors provided on a neighbouring device.
Figure 7:
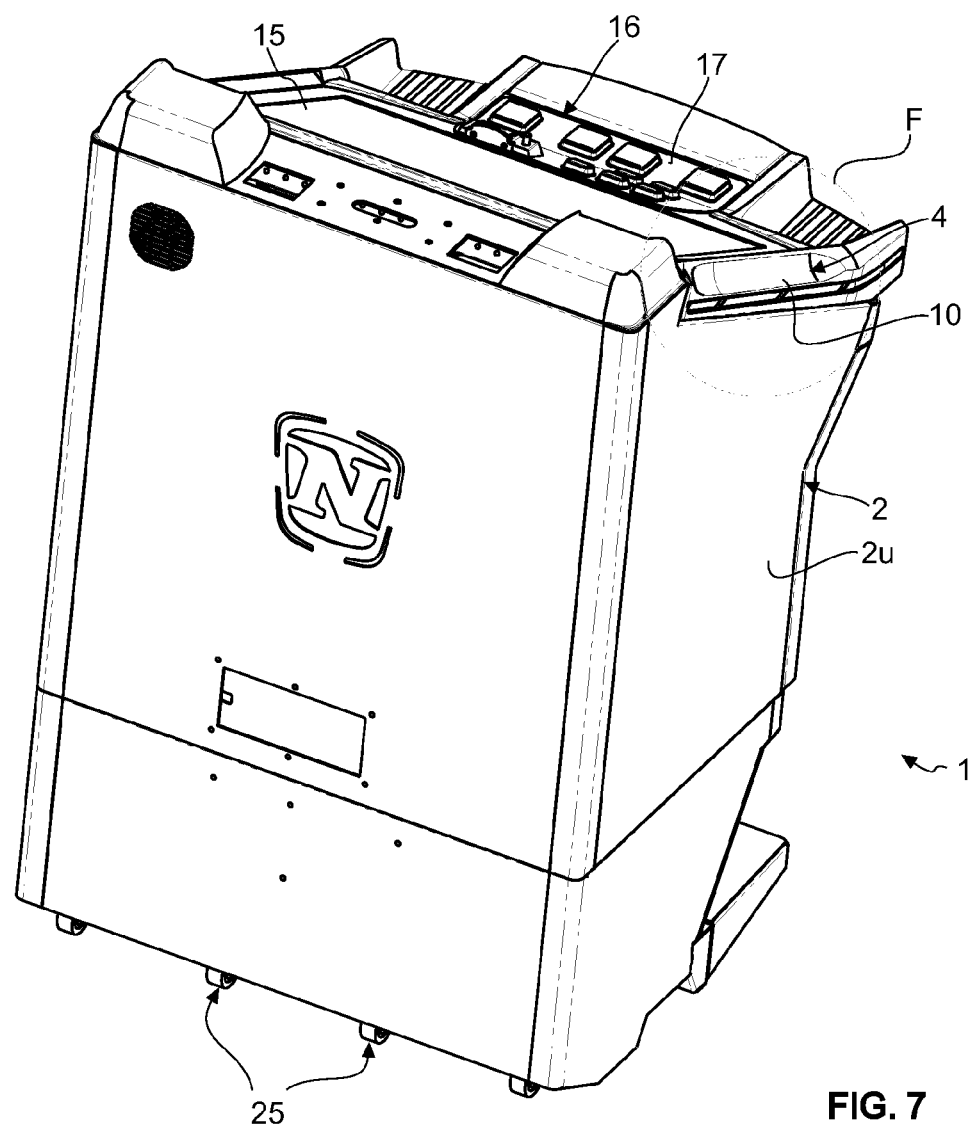
FIG. 7 shows a perspective view of the lower module of the gaming device of FIGS. 1-3.
Figure 7:
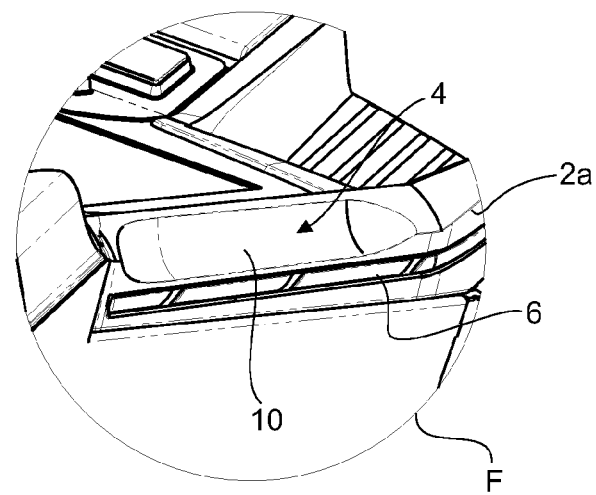

FIGS. 5-7 show reflectors 4 constructed in the form of concave depressions in the housing wall where elongated channels or grooves are formed in the edge portions of each housing part. As FIGS. 5-7 show, the elongated grooves 10 with their longitudinal axes can run parallel to the edge contours, where the longitudinal extension in the embodiment shown can amount to more than five times, and preferably more than ten times, the breadth of the respective groove.

FIG. 5 shows the grooves 10 having a concave shape, where the depth of concavity is significantly smaller than the breadth of the grooves 10.

FIGS. 1-2 show the reflectors 4 or grooves 10 arranged on the edge section of the diagonal, inclined top of the lower housing part, 2u, extend into the device depth or going inclined at an acute angle to the device depth 12. The pitch of the grooves 10 forming the reflectors 4 here advantageously matches the pitch of the top of the lower housing part, 2u. In doing so, the longitudinal extent of the said grooves 10 extends parallel to the side flanks, 2r and 2l, of the housing 2 and also parallel to the said top of the lower housing part, 2u.

Figure 4:
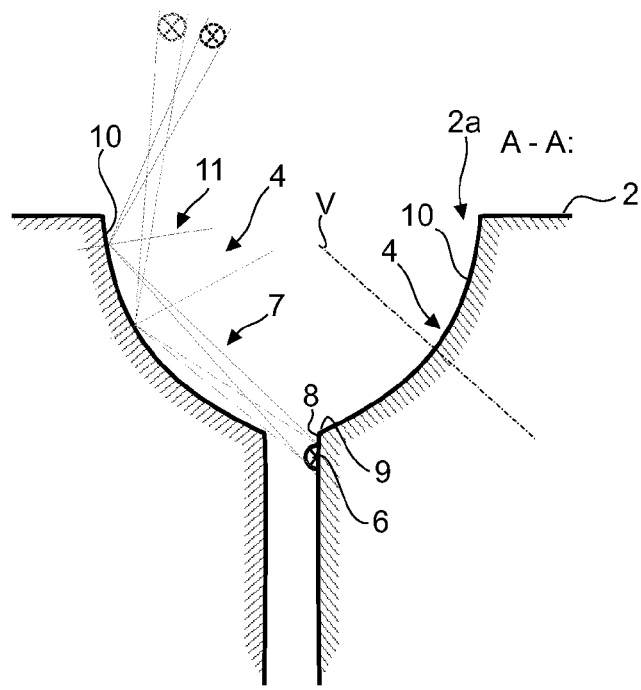
FIG. 4 shows a detail of a sectional view along the A-A line through the lateral housing edge of the gaming device from FIG. 3 and a neighbouring gaming device as shown in FIG. 8.

In the embodiment shown, the grooves 10 extend here into both adjacent housing areas on the respective housing edges. As FIG. 4 shows, a central vertical V is somewhat coincident on the groove surface or on the symmetry plane of the curved groove surface with a bisector of the angle bounded by both adjacent housing-wall surfaces as seen in FIG. 4. The reflectors 4, formed by the grooves 10, have an open capture cross section 7 for directing light to a particular side right or left of the gaming device 1 as well as to a front side of the gaming device 1.

The additional reflectors, 4, can be appropriately formed and arranged, which can be arranged on the other housing locations and their edge portions, where, for instance, the reflectors 4 provided on the side edges of the upper housing part, 2o, can basically extend in a vertical direction in such a way that they face the lateral space right or left of the gaming device 1 as well as the space in front of the gaming device's 1 front side.

FIGS. 4-6 show, light sources 6 are each arranged on the outside of the housing 2 immediately adjacent to the reflectors 4 which are constructed in the form of a light bar in the illustrated embodiment. Alternately, an LED chain or row comprising LEDs or other point light sources can also be provided. The light source 6 advantageously follows one of the respective groove's 10 edge contours on which the respective light source 6 is arranged. It is to be mentioned that the light source may equally be arranged within openings of a side wall of the housing or even within the housing and directing the light beam through openings of the housing.

FIG. 4 shows the light sources 6 of the gaming device 1 oriented to illuminate the reflectors 4 of a respective adjacent game device 1A. The light sources 6 are arranged on the outside of the housing on or in a wall section of the housing 2 which borders on the respective groove 10 of the gaming device 1 where the wall edge provided between the groove 10 and the said adjacent wall section shade, so to speak, their own groove 10. In other words, the adjacently arranged light source 6 shines its light only from the associated groove 10 away or past this so that the light is only reflected from the groove 10 on the neighbouring device 1A.

Figure 8:
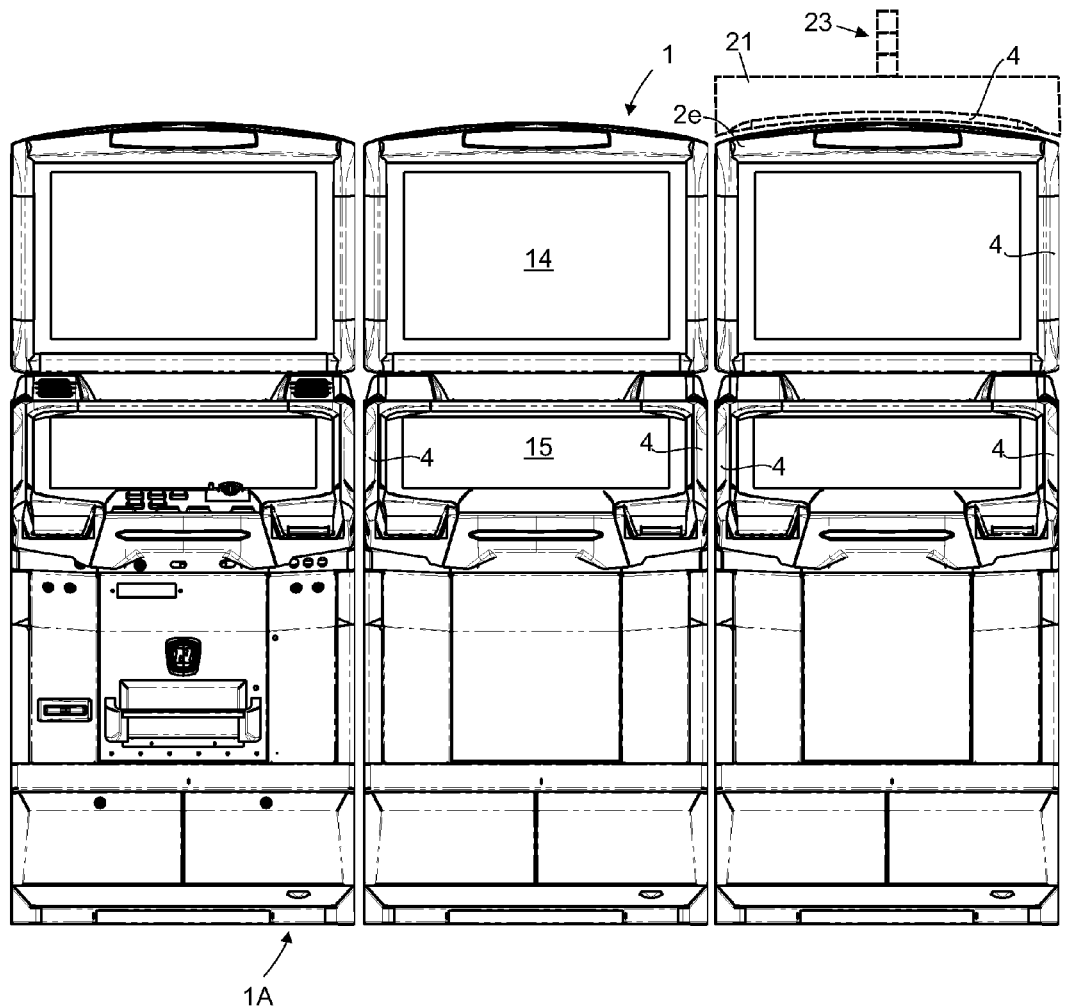
FIG. 8 shows a group of gaming devices arranged next to one another; each corresponds to the gaming device according to FIG. 1, where the light sources arranged next to the reflector-forming grooves each illuminate the neighbouring gaming device.

If adjacent gaming devices are set up so that a gap separates one from the other and they are arranged in a row, as FIG. 8 shows, then the reflectors 4 provided on the various devices come to lie next to one another as FIG. 4 shows schematically in cross section, so that the respective light sources 6 arranged on one device, for instance the gaming device 1, can illuminate the reflectors 4 of the respectively neighbouring gaming device 1A.

FIG. 8 further shows a set of gaming devices 1 in side-by-side alignment, featuring an attachment 21 mounted on the top of the said upper housing part, 2o, where the attachment 21 can include an additional loudspeaker unit and/or a blinking light unit or means of illumination, for instance, as well as a signalling device 23 to signal a device fault and/or special game state.

The attachment 21 includes a reflector 4 which extends to a lower edge or to a lower edge section of the attachment 21 and faces the upper edge section, 2e, of the upper housing part, 2o.

Figure 9:
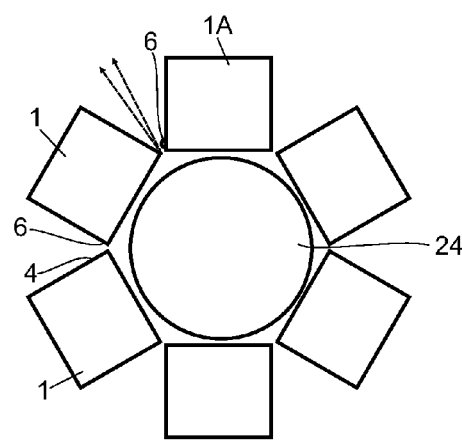
FIG. 9 shows a group of gaming devices arranged in a star pattern around a group center.

As an alternative to the sequence of various gaming devices 1 shown in FIG. 8, these can also each be arranged group-fashion in a radial arrangement, i.e. a star pattern, around a respective group center, like a column 24 as shown in FIG. 9 where the reflectors 4 can also be illuminated from respectively neighbouring gaming devices. The reflectors 4 can each be arranged or oriented in this case so that a main irradiation direction is aligned parallel to a radial direction from the group center.

Although the present invention is described in terms of particular embodiments, the invention encompasses numerous variants that would be apparent to those skilled in the art. Accordingly, the invention is to be limited only by the appended claims.

We claim:

1. A gaming device which produces a lighting effect in a zone of attraction and which is positionable near a neighboring gaming device having a light source, comprising:
    a housing having a front with edges;
    a groove formed on at least some of the edges on the front of the housing;
    a reflector embedded in the groove, the reflector being concave for capturing light from the neighboring gaming device light source and for reflecting the captured light towards the zone of attraction;
    a light bar attached to the at least some edges adjacent the reflector for directing light towards the neighboring gaming device, which reflects the directed light towards the zone of attraction; and
    whereby, the light bar and the reflector cooperate to direct light to the zone of attraction.

2. A gaming device as set forth in claim 1, wherein the light bar includes light emitting diodes (LED's) and the groove at least partially shades the reflector from the light directed by the light bar.

3. A gaming device as set forth in claim 2, wherein the light bar aligns with the reflector.

4. A gaming device as set forth in claim 3, wherein the reflector is elongated and narrow, having a length and a width, the length is at least five times the width.

5. A gaming device as set forth in claim 4, wherein the length of the reflector is at least ten times the width.

6. A gaming device as set forth in claim 5, wherein the reflector is metallic.

7. A gaming device as set forth in claim 6, wherein the light bar includes light emitting diodes (LED's).

8. A gaming device, positionable near a neighboring gaming device having a light source, which produces a lighting effect in a zone of attraction comprising:
    a housing having a front with edges;
    a groove formed on at least some of the edges of the front of the housing;
    a reflector embedded in the groove for capturing light emitted from the neighboring gaming device light source and for reflecting the captured light towards the zone of attraction;

a light bar attached to the housing on the at least some edges whereby, forming the groove on an edge, embedding the reflector in the groove consumes a minimum of space.

9. A gaming device as set forth in claim 8, wherein the light bar and the reflector direct light to the zone of attraction is in front of the gaming device.

10. A gaming device as set forth in claim 9, wherein reflector is adjacent the neighboring gaming device, the light bar directs light away from the reflector and thereby enables the groove to shade the reflector from the light directed by the light bar towards neighboring gaming device.

11. A gaming device as set forth in claim 10, wherein the reflector is elongated and narrow, having a length and a width, the length is at least five times the width.

12. A gaming device as set forth in claim 10, wherein the length of the reflector is at least ten times the width.

13. A gaming device as set forth in claim 8, wherein the reflector is metallic.

14. A gaming device as set forth in claim 8, wherein the light bar is a light emitting diode (LED) chain.

15. A first gaming device and a second gaming device, each having a light source, that cooperate to produce a lighting effect in a zone of attraction, comprising:

the first gaming device and the second gaming device both having housing with front edges;

a groove formed on at least some of the front edges of the housing of the first gaming device and the second gaming device;

a reflector embedded in the groove of each housing, each reflector being concave for capturing light emitted from the other gaming device light source and for reflecting the captured light towards the zone of attraction;

a light bar attached to the at least some of the front edges of each housing adjacent the reflector for directing light towards the other gaming device, respectively; and whereby, light from the light bar cooperates with light reflected from the neighboring gaming device to illuminate the zone of attraction.

16. A first and second gaming device as set forth in claim 15, wherein the first gaming device and second gaming device are positioned adjacent each other.

17. A first and second gaming device as set forth in claim 15, wherein the light bar includes a light emitting diode (LED) chain.

* * * * *